(12) United States Patent
Gugau et al.

(10) Patent No.: US 10,612,706 B2
(45) Date of Patent: Apr. 7, 2020

(54) RETENTION DEVICE FOR ATTACHING AN INSULATION ELEMENT AND TOOL FOR SAME

(71) Applicant: BDD Beteiligungs GmbH, Mannheim (DE)

(72) Inventors: Bernd Gugau, Heidelberg (DE); Peter Cappellucci, Mannheim (DE)

(73) Assignee: BDD Beteiligungs GmbH, Mannheim (DE)

( * ) Notice: Subject to any disclaimer, the term of this patent is extended or adjusted under 35 U.S.C. 154(b) by 317 days.

(21) Appl. No.: 15/495,816

(22) Filed: Apr. 24, 2017

(65) Prior Publication Data
US 2017/0307117 A1   Oct. 26, 2017

(30) Foreign Application Priority Data

Apr. 25, 2016   (DE) .................. 10 2016 107 637
May 10, 2016   (DE) .................. 20 2016 002 955 U
May 10, 2016   (DE) .................. 20 2016 002 956 U (51) Int. Cl.
*F16L 33/08* (2006.01)
*F16L 59/16* (2006.01)
*F16L 21/06* (2006.01)

(52) U.S. Cl.
CPC ............ *F16L 33/08* (2013.01); *F16L 21/065* (2013.01); *F16L 59/168* (2013.01)

(58) Field of Classification Search
CPC ......... F16L 23/10; F16L 23/04; F16L 21/065; F16L 33/08; F16L 59/182; F16L 59/184; Y10T 24/1427; Y10T 24/1429; Y10T 24/1431; Y10T 24/141

USPC ............ 285/407, 409, 410, 411, 420; 24/19, 24/274 R, 274 P, 274 WB
See application file for complete search history.

(56) References Cited

U.S. PATENT DOCUMENTS

| | | | |
|---|---|---|---|
| 1,467,254 A * | 9/1923 | Tarbet | |
| 2,395,745 A * | 2/1946 | King .................... | 285/420 X |
| 4,402,113 A * | 9/1983 | Smith ................ | F16L 33/08 285/411 X |
| 4,492,393 A * | 1/1985 | Schaub .............. | 285/420 X |
| 4,520,695 A | 6/1985 | Sugiyama | |
| 5,876,042 A | 3/1999 | Graf et al. | |
| 7,222,397 B2 * | 5/2007 | Ito ....................... | 285/420 X |
| 2003/0090111 A1 * | 5/2003 | Morrison ............ | F16L 33/08 285/420 |
| 2007/0126234 A1 * | 6/2007 | Wirth ................. | F16L 21/065 285/410 |

(Continued)

FOREIGN PATENT DOCUMENTS

| | | |
|---|---|---|
| DE | 43 25 757 | 2/1995 |
| DE | 102008034435 A1 | 3/2010 |

(Continued)

*Primary Examiner* — Zachary T Dragicevich
(74) *Attorney, Agent, or Firm* — Katterle Nupp LLC; Paul Katterle (57) ABSTRACT

A retention device for attaching an insulation element to a V band clamp or to another device for connecting pipe ends. The retention device includes closure elements that cooperate to permit the outer and/or inner circumference of the retention device to be decreased. The retention device further includes a bendable belt segment that may be placed about an insulation element as part of an outer covering or like a type of outer covering.

16 Claims, 9 Drawing Sheets

(56) References Cited

U.S. PATENT DOCUMENTS

2007/0209166 A1    9/2007  Lovgren et al.

FOREIGN PATENT DOCUMENTS

| EP | 0 486 299   | 5/1992 |
| EP | 2148124 A1  | 1/2010 |
| GB | 616170      | 1/1949 |
| JP | S6038992 U  | 3/1985 |

* cited by examiner

RETENTION DEVICE FOR ATTACHING AN INSULATION ELEMENT AND TOOL FOR SAME

CROSS-REFERENCE TO RELATED APPLICATION(S)

This application claims priority under 35 U.S.C. § 119 to: German Patent Application No. 10 2016 107 637.6, filed on Apr. 25, 2016; German Patent Application No. 20 2016 002 955.0, filed on May 10, 2016; and German Patent Application No. 20 2016 002 956.9, filed on May 10, 2016. All of the foregoing patent applications are herein incorporated by reference.

TECHNICAL FIELD

The present disclosure relates to a retention device for attaching an insulation element to a V band clamp or to another connection device for pipe ends to be connected, and also relates to a tool for attaching this retention device.

BACKGROUND

Already known from the prior art is connecting two pipe ends of a line using so-called V band clamps. A V band clamp has a V-shaped or essentially V-shaped longitudinal receiving element. The receiving element is curved such that it surrounds and grips axially mutually opposing annular projections of the pipe ends. By tightening a screw, the circumference of the V band clamp is reduced until it and the longitudinal receiving element are positioned securely against the pipe ends. This connects the pipe ends to one another mechanically, preferably fluid-tight. It is then possible to conduct in particular hot gases or liquids through a line created in this manner.

When conducting hot media through the line, however, the V band clamp is heated and may therefore radiate heat onto the surrounding components in an undesired manner. In particular if the V band clamp is arranged in the vicinity of temperature-sensitive components, for instance, near plastic components, electronic controls, or sensors, these components may be negatively affected by the heat.

In addition, it may be desirable to minimize the loss of heat in order to optimize the energy obtained in a system conducting fluid. In order to solve this problem, frequently V band clamps must be provided with suitable insulation elements. As a rule, such insulation elements comprise insulation mats or ready-made flexible molded insulation parts. The insulation elements have temperature-resistant technical fabric and insulating materials or temperature-resistant fabric bands that are used for wrapping and winding.

Some insulation elements are placed about a body to be insulated and attached with fastener buttons. Other insulation elements are attached with hooks and tension springs that are fitted in the insulation elements. These insulation elements are neither splash-proof nor stone-proof, however. Moreover, when used under dynamic loads they exhibit only limited resistance to vibration and they therefore have only limited durability.

Given all of this, retention devices for intumescent materials are already known from the field of fire protection. DE 43 25 757 A1 illustrates a retention device with a screw connection. EP 0 486 299 A1 illustrates a retention device in which, for fastening, metal fingers are bent after they have been pulled through slits. The retention devices known from the field of fire protection are designed for static applications and are not suitable for creating operational insulation elements on V band clamps.

This disclosure is directed to providing an insulation element to a V band clamp or another connection device for pipe ends that are to be connected, which insulation element has as long a service life as possible following simple assembly.

SUMMARY

In accordance with the disclosure, a retention device is provided for attaching an insulation element to a V band clamp or to another device for connecting pipe ends. The retention device includes first and second closure elements that are adapted to cooperate together to decrease an inner circumference of the retention device. The retention device also includes a bendable belt segment, which may be placed about the insulation element so as to form at least part of an outer covering. The belt segment extends between the first and second closure elements.

Also provided in accordance with the disclosure is a combination of a retention device for attaching an insulation element to a connection device for connecting pipe ends, and a tool for securing the retention device over the insulation element. The retention device includes first and second closure elements that are connectable to one another. The first closure element has a pull tab and the second closure element has an opening through which the pull tab may be pulled to decrease an inner circumference of the retention device. The pull tab may be wound up. The retention device further includes a bendable belt segment, which may be placed about the insulation element so as to form at least part of an outer covering. The belt segment extends between the first and second closure elements. The tool includes a gripping end with an open slit on one side, into which the pull tab may be inserted, and an adapter end adapted to be rotated so as to pull the pull tab through the opening and thereby decrease the inner circumference of the retention device.

BRIEF DESCRIPTION OF THE DRAWINGS

The features, aspects, and advantages of the present disclosure will become better understood with regard to the following description, appended claims, and accompanying drawings where:

DETAILED DESCRIPTION OF ILLUSTRATIVE EMBODIMENTS

According to the disclosure, a retention device for attaching an insulation element to a V band clamp or to another connection device for pipe ends to be connected comprises closure elements, wherein due to the cooperation between the closure elements the outer and/or inner circumference of the retention device may be decreased, and comprises a bendable belt segment, wherein the belt segment may be placed about an insulation element as part of an outer covering or like a type of outer covering. For improving the durability, resistance to stones, tightness against splashes, resistance to vibration, and assembly of insulation elements for V band clamps, this provides a flexible retention device that protects the actual insulating material from the aforesaid environmental influences and may be assembled without a great deal of technical complexity. The insulation element surrounds the V band clamp on the latter's outer circumference and is held by the retention device. The belt segment protects the insulation element from external influences and encloses the insulation element, at least in areas, or completely. The retention device, like an outer covering, protects, at least in areas, against external factors, for instance against strikes by stones, splashes of water, and the like. The retention device makes possible durable and vibration-resistant attachment of an insulation system on the V band clamp.

The belt segment may be connected and/or connectable, directly or indirectly, to a cover for receiving an overhang or closure of a V band clamp or another connection device for pipe ends. The cover ensures that a closure, specifically as a rule a screw connection of the V band clamp, can be received within the cover when the retention device and the insulation element are placed about the V band clamp. The insulation element may advantageously move in the cover if it is compressed by an overhang or closure. Because of the cover, the retention device is largely or completely prevented from deforming in an undesired manner and deviating from a round shape at critical areas.

The cover furthermore also offers protection from external influences. Given all of this, the belt segment and cover may form an outer covering, which is closed at least in areas, for surrounding the insulation and/or the V band clamp radially and/or axially. This protects the insulation and the V band clamp particularly well against external influences.

The retention device may, like a V band clamp, be lastingly attached using a screw connection. By tightening a screw, the outer and inner circumference of the retention device may be decreased, so that the latter presses the insulation element radially against the V band clamp. However, with this assembly care must be taken that the insulation element is positioned between the V band clamp and retention device for proper operation. At the same time, the person performing the assembly must produce a screw connection and tighten a screw.

A screw connection produces a secure connection, but requires the provision of screws with different lengths that may project from the retention device in an undesired manner following assembly. Given all of this, the two closure elements may be connectable or connected to one another, wherein the first closure element has a pull tab or is embodied as such, wherein the second closure element has an opening through which the pull tab may be or is pulled to decrease the outer and/or inner circumference of the retention device, and wherein the pull tab may be or is wound up and in the process of being wound up or when wound up is positioned against a support. This provides a retention device that significantly simplifies the assembly process and with which it is also possible to forego the use of additional fastening elements such as screw receptacles, screws, and screw mating receptacles.

The retention device may be embodied for attaching an insulation element based on a winding process without the use of screws. The bendable belt segment surrounds, at least in areas, a V band clamp and provides a receiving element or support for the insulation element that is arranged between the V band clamp and the retention device.

As soon as the closure elements are connected to one another, the retention device is embodied annularly and is next closed, at least temporarily. The temporary closure may occur in that a pull tab of the first closure element is drawn through an opening of the second closure element and preferably bent slightly.

Furthermore, the outer and/or the inner circumference of the retention device may be easily adjusted in a suitable manner by how far the pull tab is drawn through the receiving element. Finally, a windable pull tab, when being wound up or when wound up, is positioned against a support of the retention device and thereby establishes the retention device.

That is, when being wound up, the pull tab is reversibly or irreversibly bent or deformed such that it is no longer possible for the outer and/or the inner circumference of the retention device to expand. That is, due to the process of being wound up or after being wound up, the pull tab forms a roll or a bulge that on the one hand is positioned against the support and on the other hand, due to its width and bulkiness, can no longer slide back through the opening to further expand the outer and/or inner circumference of the retention device.

During the winding up process, the insulation element is pressed radially against the body surrounded by the retention device, that is, in particular against a V band clamp. Thus a retention device for attaching an insulation element is provided, with which device an insulation element may be placed about a V band clamp, which connects two pipe ends to one another, with no problem, positioned correctly and stably.

The pull tab may be windable or wound up in a spiral shape. A spiral shaped body occurs when a segment of the pull tab is gripped and rotated about an axis of rotation. A person performing the assembly can easily perform the gripping and rotating with tools that the person normally has.

Given all of this, the pull tab may be wound up in a spiral shape manually or by means of a cordless electric screwdriver. Manual winding up may be performed with the assistance of pliers, wherein the winding up process can be conducted relatively quickly using a cordless electric screwdriver or drill.

The pull tab may be embodied as a longitudinal strip or longitudinal tongue or as a strip-like or tongue-like element. Due to this embodiment, the pull tab is both easy to grip and easily deformable, especially bendable.

The second closure element may be embodied as a cover, wherein the opening is embodied in the cover. The retention device has a small number of parts because of this.

The retention device, but in particular the pull tab, is made of a metal, preferably stainless steel. Metals may be easily bent, reversibly or non-reversibly. Due to its resistance to corrosion, stainless steel is particularly preferably used to produce a retention device described herein. Therefore the entire retention device is preferably made of stainless steel. The retention device is preferably embodied in a single piece.

The pull tab and/or the material from which the belt segment and/or the entire retention device is made may have a thickness in the range of 0.25-1 mm. Such a thickness has proved advantageous so that on the one hand the pull tab and the belt segment are easy to bend and on the other hand it is relatively easy to perform punch- or laser processes to embody structures in the belt segment.

Given all of this, the belt segment may have or embody an opening for inserting or positioning an insulation element, wherein the belt segment has an inner base from both sides of which project support segments that are spaced apart from one another by cut-outs. The receiving element is preferably formed with an essentially U-shaped cross-section. The support segments project from the base such that the insulation element is prevented from moving in the axial direction or such movement is more difficult. The base is preferably embodied as a closed plane that prevents the insulation element from moving in the radial direction.

At least two support segments may taper in width in the direction of projection, wherein a cut-out disposed between said support segments expands in the direction of projection such that, when the belt segment is bent to decrease the outer and/or inner circumference, the lateral edges of the support segments can approach one another and the width of the cut-out is thus reduced. Because of this it is easier to bend the belt segment. During bending, the support segments preferably do not strike one another at first. The cut-outs promote the bending behavior of the belt segment using intentional material weakening. The cut-outs are embodied such that, when the belt segment is bent, the support segments come as close as possible and promote axial shielding of the insulation element and V band clamp.

Given all of this, it is also possible for the support segments not to taper in one direction, but rather for the cut-outs to be suitably selected so that the support segments, when the belt segment is bent, may approach one another or even may overlap one another in areas.

The insulation element may be connected to the retention device, at least at one site. The insulation element is preferably attached to the second closure element. In this way the insulation element is captively connected to the retention device. The person performing the assembly can insert the insulation element into the receiving element and place the retention device about a V band clamp. The insulation element may be embodied as a molded insulation part, wherein the insulation element has a fiberglass fabric or fine wire mesh.

The two closure elements may be connectable to one another using a screw connection, wherein a screw with a threaded screw end is received in a mating receptacle and the screw can be screwed into the mating receptacle to decrease the outer and/or inner circumference of the retention device. A screw connection is easy to loosen.

The threaded end of the screw may be received or pivotably received in a rotatable mating receptacle and the free end of the screw, which has a screw head, may be fitted into or fittable in a suspension bearing. In this way the assembly is simplified and the screw is captively attached to the retention device.

The rotatable mating receptacle may be associated with the first closure element and/or the first belt segment, and the suspension bearing may be associated with the second closure element and/or the cover. In this way a long screw may project toward the belt segment. It is possible to prevent the screw from projecting beyond the cover or overhanging in a disadvantageous manner.

The insulation element may have lamination that is arranged facing away from the base and/or radially inward. The lamination may protect insulating material disposed behind it from abrasion.

The insulation element may be joined to the retention device by an adhesive in areas. An adhesive may be used cost-effectively and for rapid production.

A tool may be prepared as an insulated spare part for embodying a retention device of the type described herein. The tool may comprise a gripping end with an open slit on one side, into which slit the pull tab may be inserted, and an adapter end. The adapter end may be embodied as a square, as a hexagon, or in some other manner. The tool may be embodied like a pin so that the pull tab may be wound around the tool. The adapter end of the pin is embodied such that it may be easily grasped by a chuck of a cordless electric screwdriver, a drill, or a key, for turning or rotating.

With such a tool, or with another tool, a method for attaching an insulation element by means of a retention device of the type described herein may be performed in the following manner. A first end of the retention device, with which end the first closure element is associated, and a second end of the retention device, with which end the second closure element is associated, are connected to one another, wherein the belt segment, which extends between the closure elements, is bent, wherein the two ends are connected by the cooperation of the closure elements in that the pull tab of the first closure element or the pull tab as the first closure element is drawn through an opening of the second closure element, wherein the pull tab is wound up to decrease the outer and/or inner circumference of the retention device and to embody it, and wherein the pull tab when being wound up or when wound up is positioned against a support of the retention device.

The retention device described herein is suitable in particular for use in dynamically loaded pipe connections. The retention device is preferably flexibly bendable and made of metal.

Figure 1:
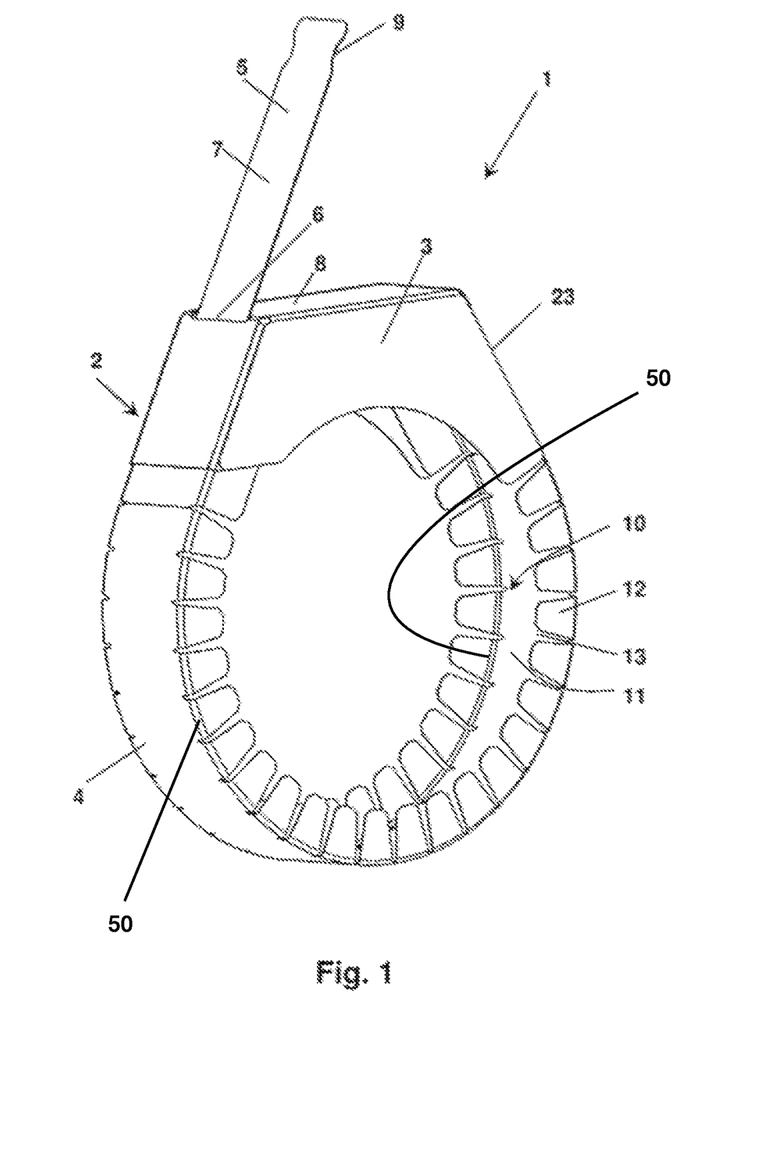
FIG. 1 is a perspective elevation of a retention device for attaching an insulation element, wherein the retention device is not yet finally closed, but the pull tab, for temporarily connecting the closure elements, has already been drawn through the opening of a second closure element that is embodied as a cover.
Figure 9:
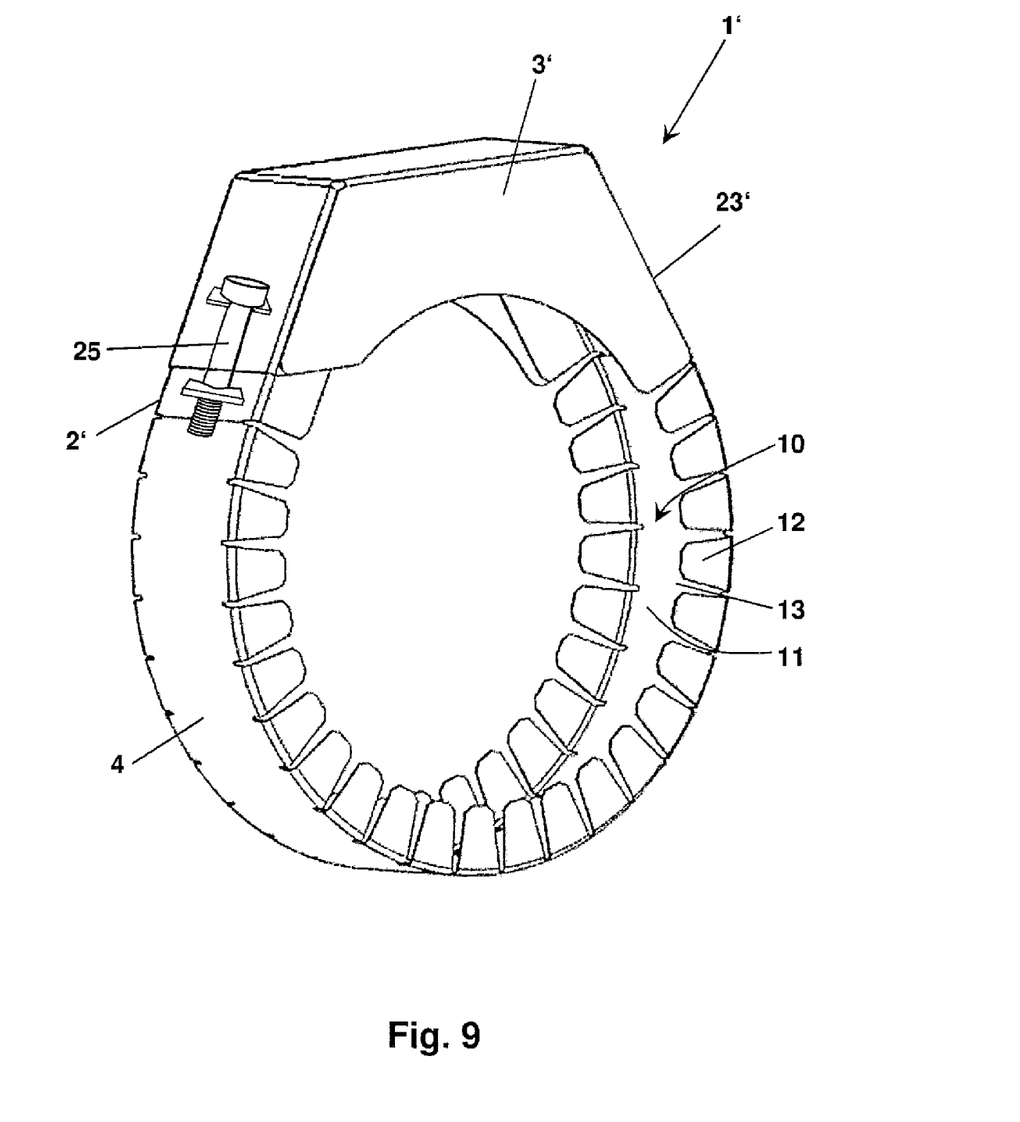
FIG. 9 is a perspective elevation of another retention device for attaching an insulation element, wherein the retention device is closed and has a screw connection for decreasing the outer and inner circumference and wherein the second closure element is embodied as a cover.
Figure 10:
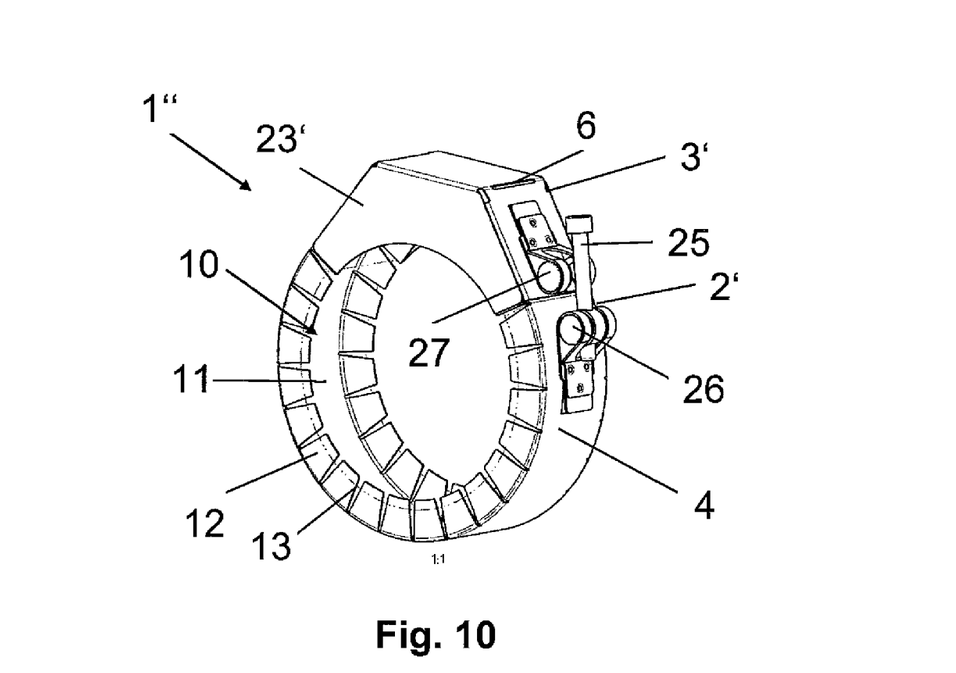
FIG. 10 is a perspective elevation of another retention device that has a pivotable and suspendable screw.
Figure 11:
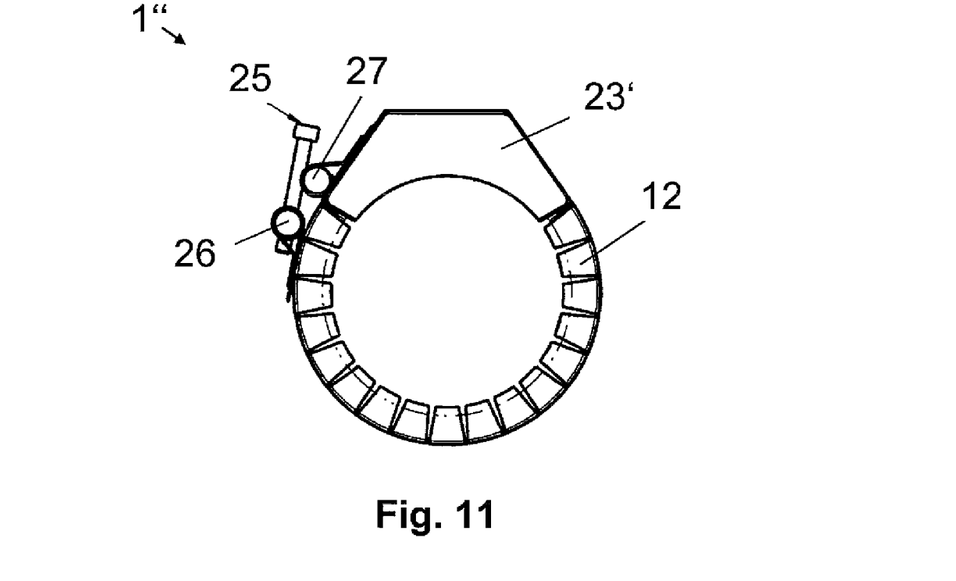
FIG. 11 is a side view of the retention device according to FIG. 10.
Figure 12:
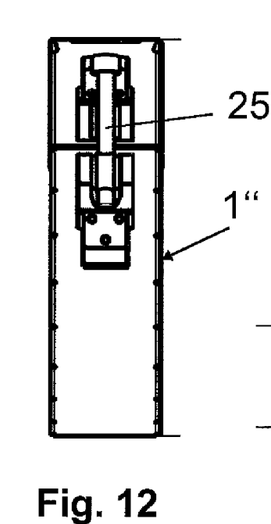
FIG. 12 is a view of the retention device according to FIGS. 10 and 11, wherein the screw connection is depicted.
Figure 13:
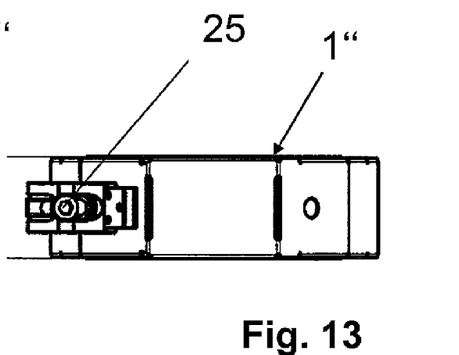
FIG. 13 is another view of the retention device according to FIG. 12.

FIGS. 1 and 9 each depict a retention device 1, 1' for attaching an insulation element to a V band clamp or to another connection device for pipe ends to be connected, comprising closure elements 2, 2', 3, 3', wherein due to the cooperation of the closure elements 2, 2', 3, 3' the outer and/or inner circumference of the retention device 1, 1' may be decreased. Both retention devices 1, 1' comprise a bendable belt segment 4 that may be placed about an insulation element as part of an outer covering or like an outer covering. The belt segment 4 is connected and/or connectable, directly or indirectly, to a cover 23, 23' for receiving an overhang or closure of a V band clamp or of another connection device for pipe ends.

FIGS. 1 through 6 depict a retention device 1 in which the two closure elements 2, 3 may be or are connected to one another, wherein the first closure element 2 has a pull tab 5 or is embodied as one, wherein the second closure element 3 has an opening 6 through which the pull tab 5 may be or is pulled for decreasing the outer and/or inner circumference of the retention device 1, and wherein the pull tab 5 may be or is wound up and in the process of being wound up or when wound up is positioned on a support 8. The second closure element 3 is embodied as a cover 23, wherein the cover 23 embodies the opening 6.

FIGS. 1 through 4 depict a specific retention device 1 for attaching an insulation element (not shown), comprising a first end, to which is associated with first closure element 2, a second end, which is associated with a second closure element 3, and a bendable belt segment 4 that extends between the closure elements 2, 3, wherein the two ends may be connected or are connected to one another by cooperation of the closure elements 2, 3, wherein the first closure element 2 has a pull tab 5 and wherein the second closure element 3 has an opening 6 through which the pull tab 5 may be or is drawn.

Figure 2:
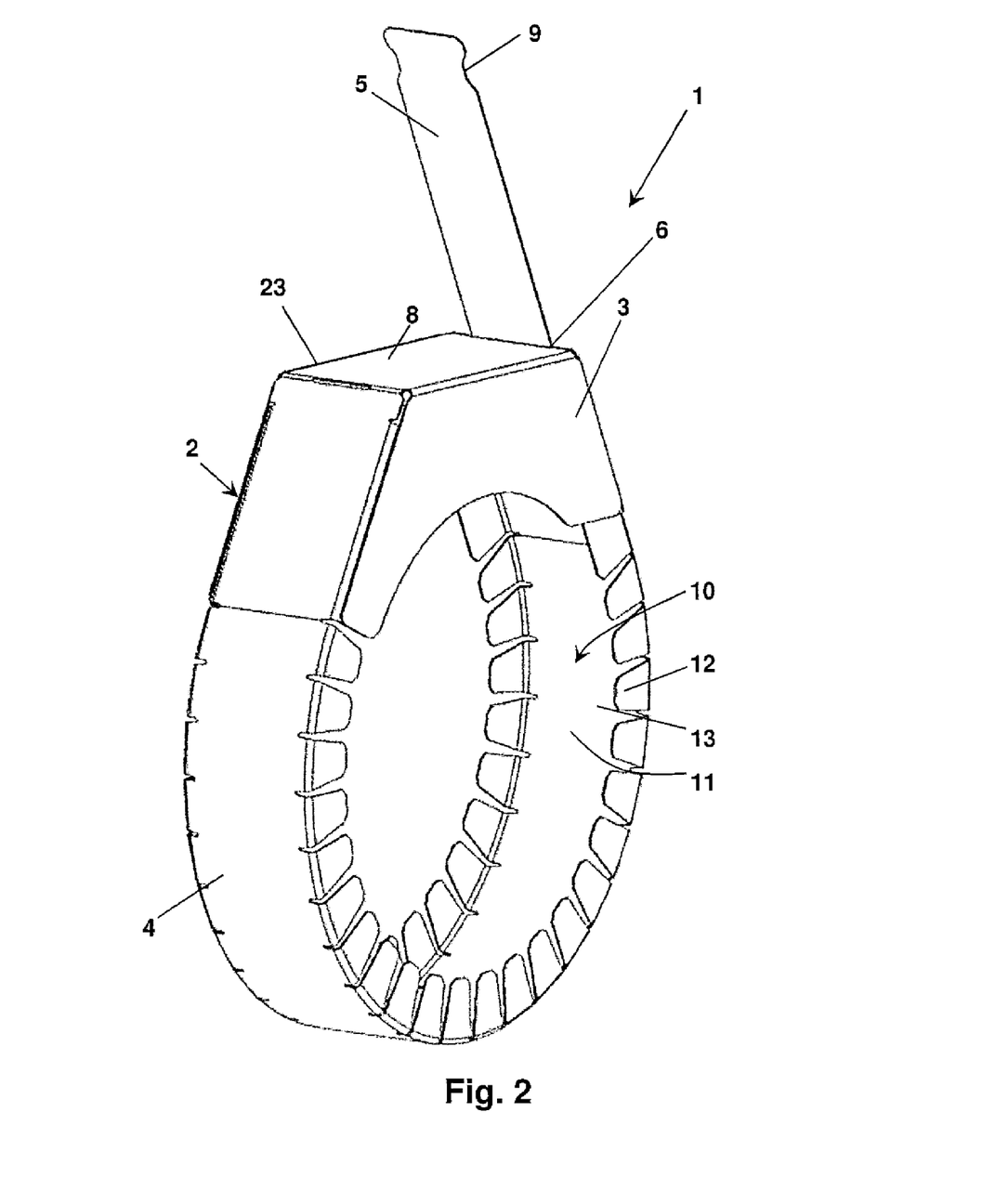
FIG. 2 is another perspective elevation of the retention device according to FIG. 1, wherein a view of the inner surface of the pull tab is depicted.
Figure 3:
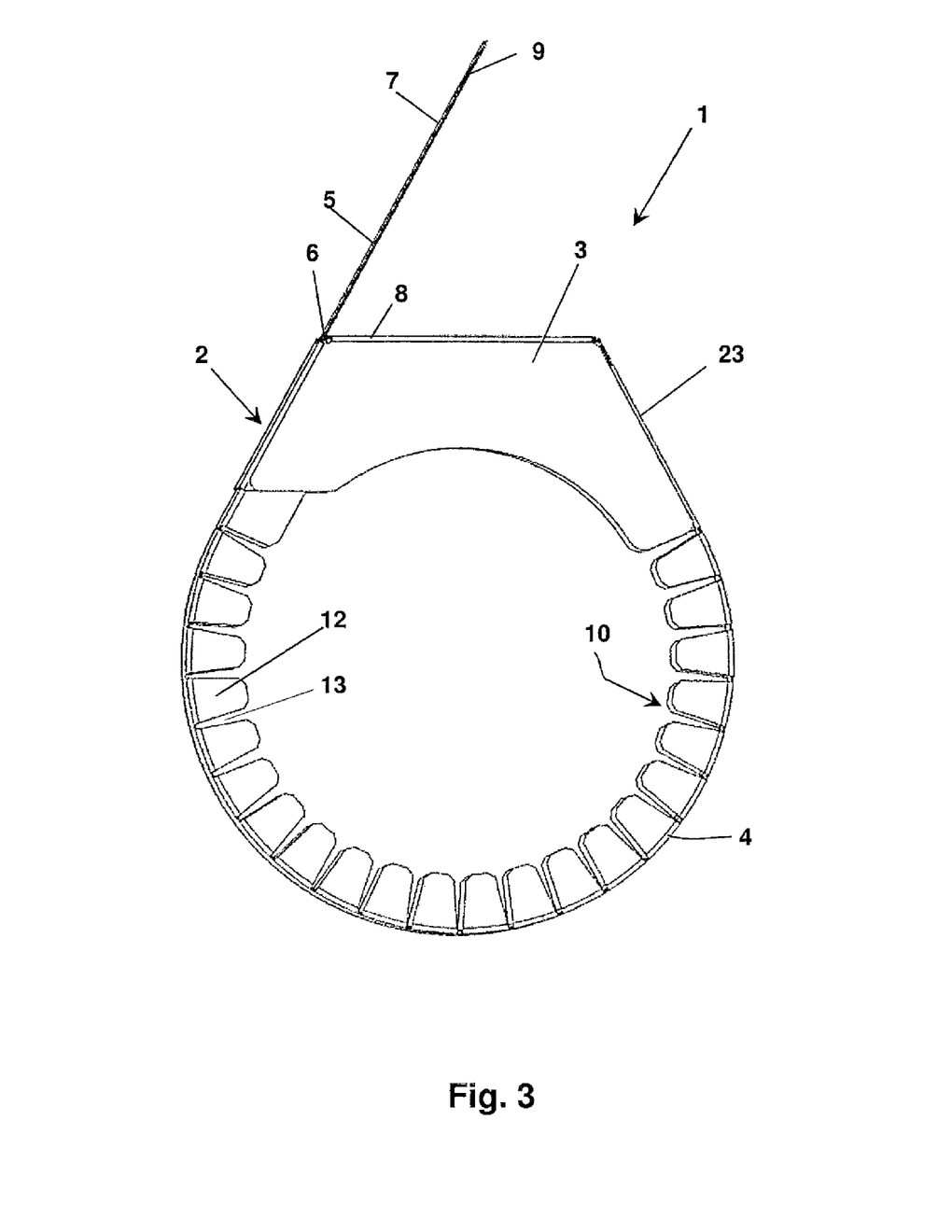
FIG. 3 is a side view of the retention device according to FIGS. 1 and 2.

FIGS. 1 through 3 illustrate that the pull tab 5 may be wound up and when being wound up its outer surface 7 is positioned against a support 8 of the second closure element 3. In this respect the pull tab 5 may be wound up and when being wound up is positioned against the support 8 and is supported thereby.

Figure 4:
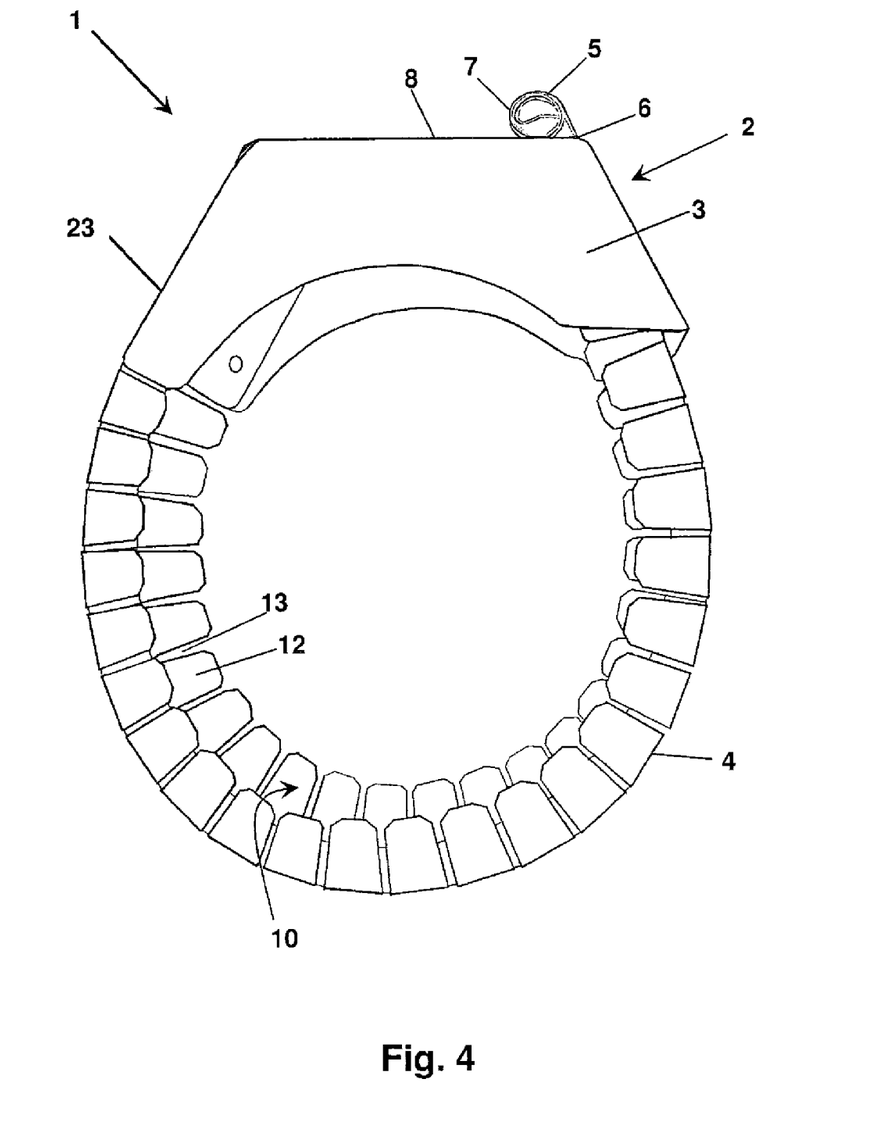
FIG. 4 is a view of the retention device according to FIG. 1, wherein the retention device is closed and ready for operation and the pull tab has been wound up into a spiral shape.
Figure 5:
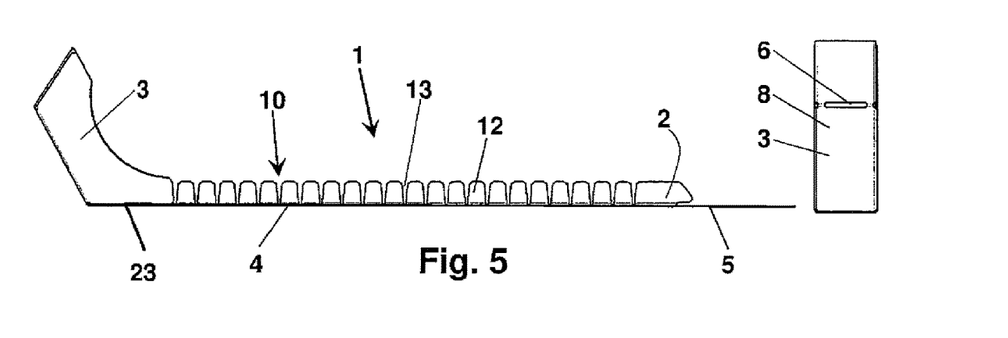
FIG. 5 is a side view onto the left-hand side of the retention device according to FIG. 1, unrolled and disposed in one plane, and a top view of the slit-like opening in the second closure element on the right-hand side.
Figure 6:
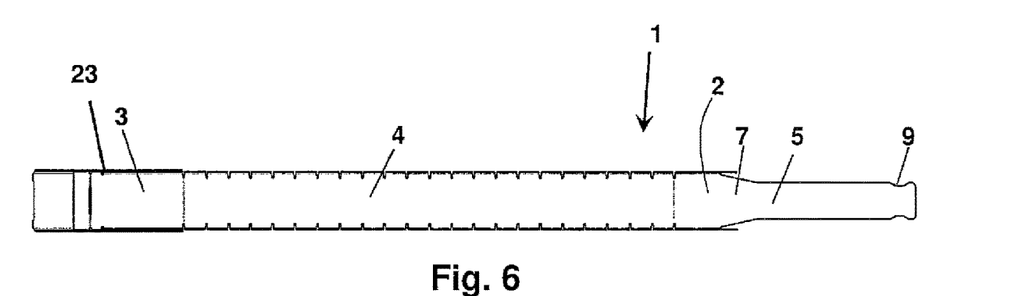
FIG. 6 is a view of the retention device according to FIG. 5, from below.

FIG. 4 illustrates that the pull tab 5 is wound up and its outer surface 7 when wound up is positioned against a support 8 of the second closure element 3. In this respect the pull tab 5 is wound up and when wound up is positioned against the support 8 and is supported thereby. FIG. 4 shows specifically that the pull tab 5 has been wound up in a spiral shape.

According to FIGS. 1 through 3 the pull tab 5 may be wound up in a spiral shape manually or by means of a cordless electric screwdriver and may be brought to the state illustrated in FIG. 4. For this, the pull tab 5 is embodied as a long strip or long tongue or like a strip or like a tongue. At its free end it has a narrowing 9 that permits it to be easily gripped and bent or wound up using a tool. The pull tab 5 and the material, from which the belt segment 4 and the entire retention device 1 are made, are 0.5 mm in thickness.

FIGS. 1 through 5 illustrate that the belt segment 4 has a receiving element 10 for the insertion or placement of an insulation element and embodies this receiving element 10. For this, the belt segment 4 has an inner base 11 from both sides of which project support segments 12 that are spaced apart from one another by cut-outs 13. The support segments 12 are joined to the inner base 11 at peripheral bends 50 that extend in the longitudinal direction of the belt segment 4. At least two support segments 12 taper in their width in the projecting direction, wherein a cut-out 13 disposed therebetween in the projecting direction expands such that, when the belt segment 4 is bent for decreasing the outer and/or inner circumference, the side edges of the support segments 12 may approach one another and the width of the cut-out 13 thereby decreases.

The support segments 12 are spaced apart from one another by the cut-outs 13. The support segments 12 project from the base 11, wherein they are at an angle of 80 to 100° to the latter. This is particularly clearly illustrated in FIG. 5. A plurality of adjacent support segments 12 are arranged on opposing longitudinal sides of the base 11 in the manner of a palisade. One cut-out 13, in the form of a slit that expands in a V-shape and is open on one side, is embodied between each two adjacent support segments 12. The cut-outs 13 may be added using punch processes or using a laser.

Figure 7:
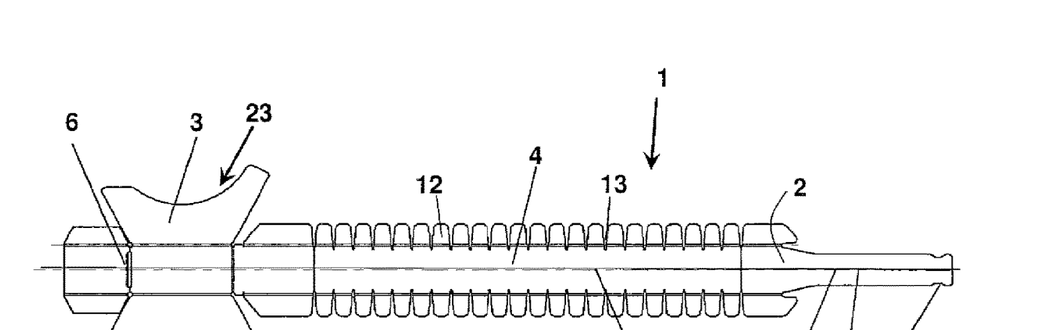
FIG. 7 is a view of a blank that will be used to make the retention device according to FIG. 1.

FIG. 7 illustrates that the retention device 1 is embodied in one piece and is made of a metal layer. The metal layer comprises stainless steel. The metal layer is 0.5 mm thick. Due to a continuous edge, the projecting side elements shown to the left in FIG. 7 may be bent and connected using riveting to create the second closure element 3 or the cover 23. Due to the edge, as well, the support segments 12 may be bent to embody a receiving element 10. The first closure element 2 and the pull tab 5 are embodied in a single piece and transition from one into the other. The pull tab 5 becomes the first closure element 2 in that the width of the pull tab 5 increases. Because of this the pull tab 5 may only be pulled through the opening 6 for a certain distance.

Figure 8:
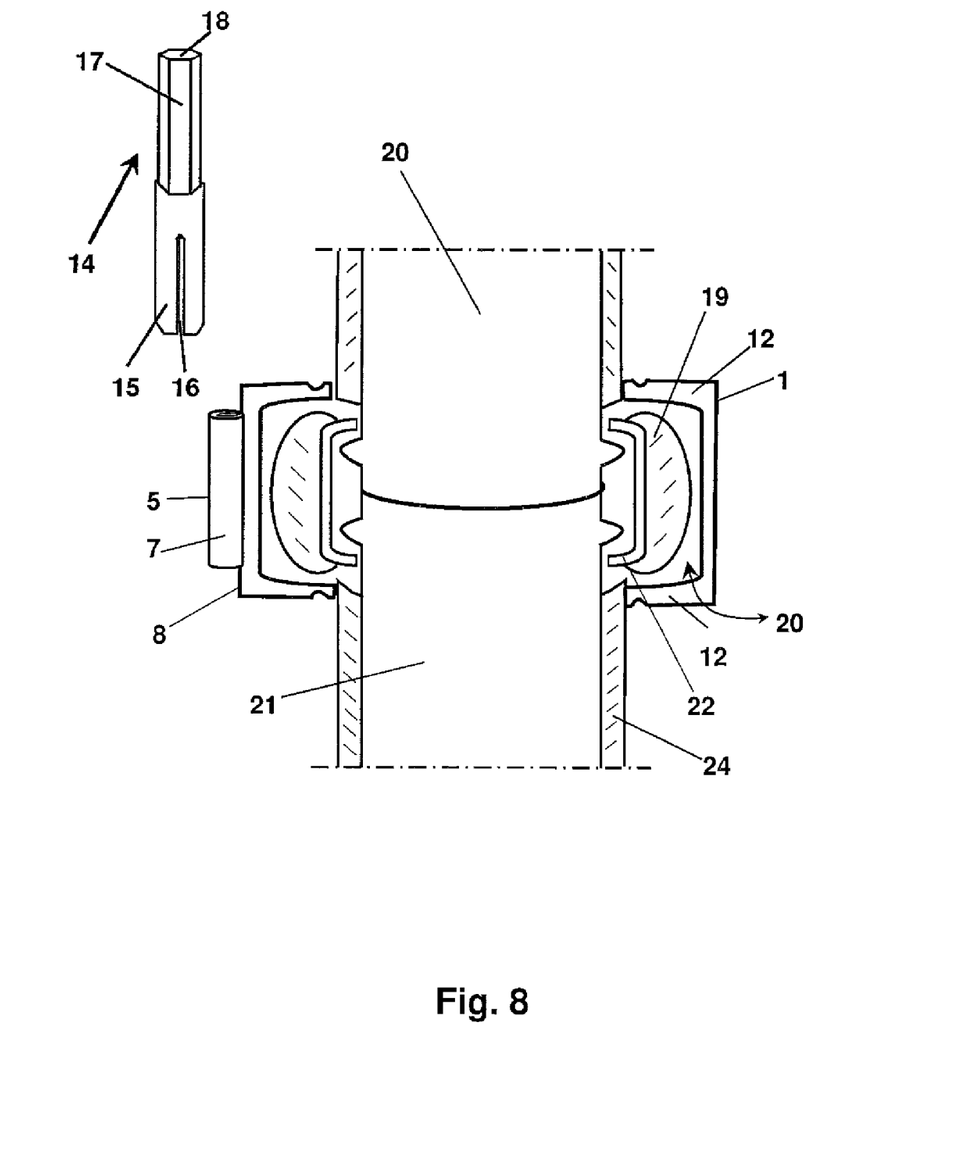
FIG. 8 is a schematic depiction, on the left-hand side, of a tool for winding up the pull tab, and on the right-hand side, of an arrangement that comprises two pipe ends that are connected to one another, gas-tight, using a V band clamp, wherein the V band clamp is surrounded by an insulation element that is received in a retention device according to FIG. 4, and wherein the retention device encloses the V band clamp and the insulation element, both radially and axially, like an outer covering.

The left-hand portion of FIG. 8 depicts a rotatable pin-shaped tool 14 for embodying the retention device 1. The tool 14 comprises a gripping end 15, which has a slit 16 that is open on one side and into which the pull tab may be inserted, and an adapter end 17 embodied as a hexagon 18. The gripping end 15 is used to grasp and roll up the pull tab 5. The adapter end 17 may be connected to a turnable or rotatable chuck. For this, the adapter end 17 is provided with a hexagon 18. However, it is also possible for the adapter end 17 to be embodied differently so that it may be grasped well by a tool.

With the tool 14 described in the foregoing it is possible to execute a method for attaching an insulation element 19 by means of the retention device 1, wherein the first end of the retention device 1, with which the first closure element 2 is associated, and the second end of the retention device 1, with which the second closure element 3 is associated, are connected to one another, wherein the belt segment 4, which extends between the closure elements 2, 3, is bent, wherein the two ends are connected by cooperation between the closure elements 2, 3 in that the pull tab 5 of the first closure element 2 is drawn through the opening 6 of the second closure element 3, wherein the pull tab 5 is wound up to decrease the outer and inner circumference of the retention device 1 and to embody it, and wherein its outer surface 7, when being wound up or when wound up, is positioned against a support 8 of the second closure element 3. The winding up is performed by turning the tool 14, its slit 16 being engaged with pull tab 5.

The drawing to the right in FIG. 8 is a schematic view of an arrangement comprising two pipe ends 20, 21 that are securely connected to one another, gas tight, by a V band clamp 22, wherein the V band clamp 22 is surrounded by an insulation element 19 and wherein the insulation element 19 is received in the receiving element 10 of the retention device 1. The retention device 1 presses the insulation element 19 radially against the V band clamp 22 and encloses, radially and axially like a type of outer covering, both the V band clamp 22 and the insulation element 19. This protects the insulation element 19 and the V band clamp 22 against strikes by stones if the arrangement is arranged on an underbody of a motor vehicle, for instance.

Each of the pipe ends 20, 21 is also additionally insulated by an insulating covering 24 that terminates inside the retention device 1 in order to produce nearly complete insulation. The insulation element 19 is connected to the retention device 1 at at least one site. The insulation element 19 is established at the second closure element 3.

In the specific retention device 1 illustrated here, only one pull tab 5 is provided. Assembly can be accomplished rapidly by winding up a single pull tab 5. The opening 6 in the second closure element 3 is embodied as a slit surrounded on four sides. Thus, the pull tab 5 cannot move out of place laterally. The slit or the opening 6 is longitudinal. The slit or the opening 6 is narrow enough that the pull tab 5 may be passed through it with just a little clearance. Because of this, the pull tab 5 cannot slide back through the slit or the opening 6, even if it has only been wound up a little, that is, with only a few windings.

FIG. 9 depicts a retention device 1' in which no pull tab is used, but instead a screw 25 is used to connect the closure elements 2', 3' to one another. The second closure element 3' is embodied as a cover 23'.

FIGS. 10 through 14 depict another retention device 1" in which the two closure elements 2', 3' may be connected to one another using a screw connection.

A threaded screw end of a screw 25 is received in a mating receptacle 26, and the screw 25 may be screwed into the mating receptacle 26 to decrease the outer and/or inner circumference of the retention device 1".

The threaded screw end of the screw 25 may be received and pivoted in a rotatable mating receptacle 26.

The free end of the screw 25, which has a screw head, may be fitted in a suspension bearing 27. Once fitted, tightening the screw 25 into the mating receptacle 26 makes it possible to press the retention device 1" against the radially interior elements.

The rotatable mating receptacle 26 is associated with the belt segment 4, specifically it is attached thereto. The suspension bearing 27 is associated with the cover 23', specifically it is attached thereto.

Figure 14:
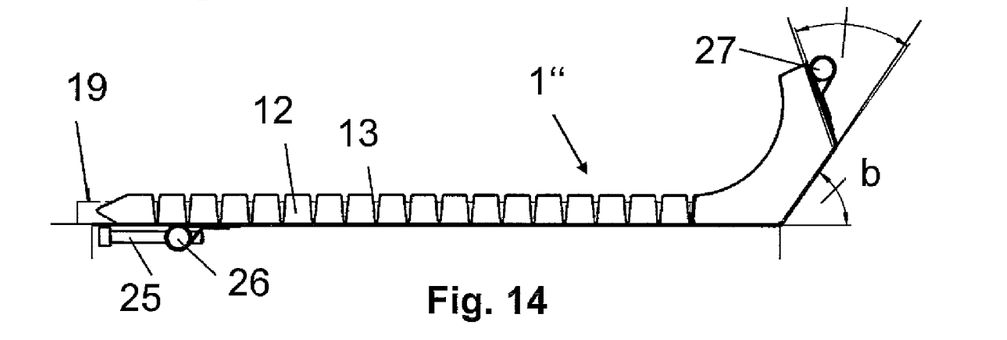
FIG. 14 is a side view of the retention device according to FIG. 10, rolled up and unclosed.

FIG. 14 depicts the retention device 1" rolled up with insulation element 19 placed therein. Two angles, a and b, each 55°, are shown to illustrate gradients of the cover 23'.

Figure 15:
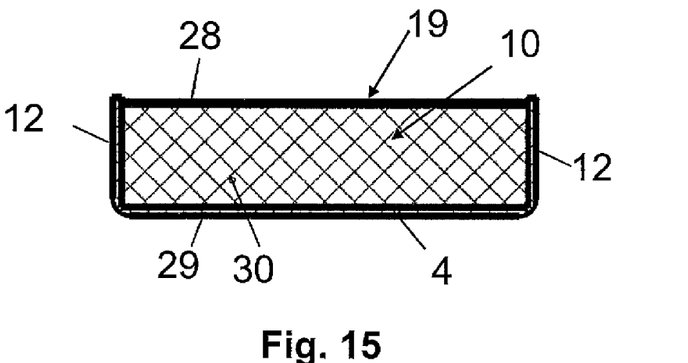
FIG. 15 is a side view of an insulation element placed between the side bars.

FIG. 15 illustrates that the insulation element 19 has a lamination 28 that faces away from the base 11 and is arranged radially inward. The lamination 28 is applied to an insulating material 30. The insulation element 19 is connected, in areas, to the retention device 1" by an adhesive 29.

In its cover 23' the retention device 1" has an opening 6 through which the pull tab 5 could be pulled. In this respect it is possible to have a combination of a screw connection and a connection by means of the pull tab 5 described herein.

It is to be understood that the description of the foregoing exemplary embodiment(s) is (are) intended to be only illustrative, rather than exhaustive. Those of ordinary skill will be able to make certain additions, deletions, and/or modifications to the embodiment(s) of the disclosed subject matter without departing from the spirit of the disclosure or its scope.

What is claimed is:

1. A retention device for attaching an insulation element to a connection device for connecting pipe ends, comprising:
   first and second closure elements that are connectable together to decrease an inner circumference of the retention device, the first closure element having a pull tab and the second closure element having an opening through which the pull tab may be pulled to decrease the inner circumference of the retention device, wherein the pull tab is constructed to be wound up in a spiral shape and positioned against a support; and
   a bendable belt segment, which may be placed about the insulation element so as to form at least part of an outer covering, the belt segment extending between the first and second closure elements, wherein the belt segment defines a space within which the insulation element may be disposed, and wherein the belt segment has an inner base disposed between outwardly-projecting support segments, the support segments being joined to the inner base at peripheral bends that extend in the longitudinal direction of the belt segment;
   wherein the support segments are spaced apart from one another by cut-outs; and
   wherein at least two support segments taper in width in the direction of projection, wherein a cut-out disposed between said at least two support segments expands in the direction of projection such that, when the belt segment is bent to decrease the inner circumference, the lateral edges of the support segments can approach one another and the width of the cut-out is thus reduced.

2. The retention device according to claim 1, wherein the belt segment is connected to the second closure element, which comprises a cover for receiving a portion of the connection device.

3. The retention device according to claim 1, wherein the pull tab is a longitudinal strip.

4. The retention device according to claim 1, wherein the second closure element is a cover, and wherein the opening is in the cover.

5. The retention device according to claim 1, wherein the belt segment has a generally U-shaped cross-section.

6. The retention device according to claim 5, wherein the support segments project from the inner base at an angle from 80° to 100°.

7. An insulating apparatus comprising:
   a retention device for attaching an insulation element to a connection device for connecting pipe ends, comprising:
      first and second closure elements that are connectable together to decrease an inner circumference of the retention device, the first closure element having a pull tab and the second closure element having an opening through which the pull tab may be pulled to decrease the inner circumference of the retention device, wherein the pull tab is constructed to be wound up in a spiral shape and positioned against a support; and
      a bendable belt segment, which may be placed about the insulation element so as to form at least part of an outer covering, the belt segment extending between the first and second closure elements, wherein the belt segment defines a space within which the insulation element may be disposed, and wherein the belt segment has an inner base disposed between outwardly-projecting support segments, the support segments being joined to the inner base at peripheral bends that extend in the longitudinal direction of the belt segment; and an insulation element connected to the retention device, at least at one site, and wherein the insulation element is attached to the second closure element; and wherein the insulation element has a first side located toward the belt segment and a second side located away from the belt segment, and wherein the insulation element includes a lamination on its second side.

8. The insulating apparatus of claim 7, wherein the insulation element may be joined to the retention device by an adhesive.

9. The insulating apparatus of claim 7, wherein the belt segment of the retention device is connected to the second closure element of the retention device, and wherein the second closure element comprises a cover for receiving a portion of the connection device.

10. The insulating apparatus of claim 7, wherein the insulation element is molded and comprises fiberglass fabric or fine wire mesh.

11. The insulating apparatus of claim 7, wherein the belt segment has a generally U-shaped cross-section.

12. The insulating apparatus of claim 11, wherein the support segments project from the inner base at an angle from 80° to 100°.

13. In combination, a retention device for attaching an insulation element to a connection device for connecting pipe ends, and a tool for securing the retention device over the insulation element, wherein the retention device comprises:

first and second closure elements that are connectable to one another, wherein the first closure element has a pull tab and the second closure element has an opening through which the pull tab may be pulled to decrease an inner circumference of the retention device, and wherein the pull tab is constructed to be wound up; and a bendable belt segment, which may be placed about the insulation element so as to form at least part of an outer covering, the belt segment extending between the first and second closure elements, wherein the belt segment defines a space within which the insulation element may be disposed, and wherein the belt segment has an inner base disposed between outwardly-projecting support segments, the support segments being joined to the inner base at peripheral bends that extend in the longitudinal direction of the belt segment; and wherein the tool comprises a gripping end with an open slit on one side, into which the pull tab may be inserted, and an adapter end adapted to be rotated so as to pull the pull tab through the opening and thereby decrease the inner circumference of the retention device.

14. The combination of claim 13, wherein the adapter end of the tool has a hexagonal cross section.

15. The combination of claim 13, wherein in the retention device, at least two support segments taper in width in the direction of projection, wherein a cut-out disposed between said at least two support segments expands in the direction of projection such that, when the belt segment is bent to decrease the inner circumference, the lateral edges of the support segments can approach one another and the width of the cut-out is thus reduced.

16. The combination of claim 13, wherein the belt segment of the retention device is connected to the second closure element of the retention device, and wherein the second closure element comprises a cover for receiving a portion of the connection device.

* * * * *